United States Patent
Vidyanand

(10) Patent No.: US 8,294,925 B2
(45) Date of Patent: *Oct. 23, 2012

(54) APPARATUS AND METHODS FOR TRANSFERRING PRINTER DRIVER PREFERENCES

(75) Inventor: Ramgopal Vidyanand, Cupertino, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/236,137

(22) Filed: Sep. 27, 2005

(65) Prior Publication Data

US 2006/0023246 A1 Feb. 2, 2006

Related U.S. Application Data

(63) Continuation of application No. 09/360,861, filed on Jul. 23, 1999, now Pat. No. 6,967,728.

(51) Int. Cl.
*G06F 3/12* (2006.01)
*G06F 3/00* (2006.01)
*G06F 13/00* (2006.01)

(52) U.S. Cl. ........ 358/1.15; 358/1.1; 719/321; 719/327; 710/8; 710/14; 713/100

(58) Field of Classification Search .................. 358/1.1, 358/1.13, 1.15; 709/220, 221, 222, 227, 709/228; 710/8, 10, 14, 15, 16, 19, 62, 72; 713/1, 100; 715/273, 274, 276, 700, 733, 715/735, 736, 737, 740, 747, 748, 751, 813, 715/822, 823, 824, 825, 866; 719/321, 327

See application file for complete search history.

(56) References Cited

U.S. PATENT DOCUMENTS 4,979,107 A * 12/1990 Advani et al. ................. 710/100
5,228,118 A 7/1993 Sasaki (Continued)

FOREIGN PATENT DOCUMENTS

EP 665677 8/1995

(Continued)

OTHER PUBLICATIONS

Please Note That the "Boldt" US Patent 6,349,304.*

*Primary Examiner* — David K Moore
*Assistant Examiner* — Peter L Cheng
(74) *Attorney, Agent, or Firm* — Michael A. Glenn; Glenn Patent Group

(57) ABSTRACT

A system is provided for supporting multiple platforms with common personal preferences for printer drivers. The set preferences for the printer driver are therefore reusable and may be moved from one driver to another. The system involves the provision of a common format for printer driver preferences. When a new printer is brought to a system or a user moves to a station that uses a different printer, the preferences are readily moved to that location. Further, an MIS department may provide a corporate wide printer preference solution, for example for printing a particular page or printing in a particular style. The preferences may not be identical for each printer due to differences in the capabilities of various platforms. The printer preferences overwrite a default value in printers with preferences, to the extent that each printer has the options available. To the extent that these options are not available, the printer reverts to its default setting.

2 Claims, 13 Drawing Sheets

U.S. PATENT DOCUMENTS

| | | | | |
|---|---|---|---|---|
| 5,229,814 A | * | 7/1993 | Hube et al. | 399/14 |
| 5,353,388 A | | 10/1994 | Motoyama | |
| 5,375,204 A | | 12/1994 | Motoyama et al. | |
| 5,438,650 A | | 8/1995 | Motoyama et al. | |
| 5,450,571 A | | 9/1995 | Rosekrans et al. | |
| 5,467,434 A | * | 11/1995 | Hower et al. | 358/1.15 |
| 5,469,533 A | | 11/1995 | Dennis | |
| 5,475,801 A | | 12/1995 | Brindle et al. | |
| 5,515,481 A | | 5/1996 | Pardo | |
| 5,555,350 A | | 9/1996 | Strauss | |
| 5,577,177 A | | 11/1996 | Collins et al. | |
| 5,580,177 A | * | 12/1996 | Gase et al. | 400/61 |
| 5,608,720 A | | 3/1997 | Biegel et al. | |
| 5,611,046 A | | 3/1997 | Russell et al. | |
| 5,625,757 A | | 4/1997 | Kageyama et al. | |
| 5,625,758 A | | 4/1997 | Schneider et al. | |
| 5,630,076 A | | 5/1997 | Saulpaugh et al. | |
| 5,633,992 A | | 5/1997 | Gyllenskog | |
| 5,638,521 A | | 6/1997 | Buchala et al. | |
| 5,647,056 A | | 7/1997 | Barrett et al. | |
| 5,687,303 A | | 11/1997 | Motamed et al. | |
| 5,699,494 A | | 12/1997 | Colbert et al. | |
| 5,715,379 A | | 2/1998 | Pavlovic et al. | |
| 5,717,840 A | | 2/1998 | Pardo | |
| 5,729,666 A | | 3/1998 | Komsella et al. | |
| 5,731,823 A | | 3/1998 | Miller et al. | |
| 5,768,483 A | | 6/1998 | Maniwa et al. | |
| 5,774,638 A | | 6/1998 | Kageyama et al. | |
| 5,781,714 A | | 7/1998 | Collins et al. | |
| 5,799,206 A | | 8/1998 | Kitagawa et al. | |
| 5,802,260 A | | 9/1998 | Shimakawa et al. | |
| 5,802,365 A | | 9/1998 | Kathail et al. | |
| 5,982,996 A | | 11/1999 | Snyders | |
| 6,149,323 A | * | 11/2000 | Shima | 400/76 |
| 6,182,212 B1 | * | 1/2001 | Atkins et al. | 713/1 |
| 6,182,225 B1 | * | 1/2001 | Hagiuda et al. | 726/19 |
| 6,184,998 B1 | * | 2/2001 | Tebeka | 358/1.15 |
| 6,236,462 B1 | | 5/2001 | Terasaka | |
| 6,293,646 B1 | * | 9/2001 | Beachnau Hood et al. | 347/23 |
| 6,349,304 B1 | * | 2/2002 | Boldt et al. | 1/1 |
| 6,452,607 B1 | * | 9/2002 | Livingston | 715/705 |
| 6,684,260 B1 | * | 1/2004 | Foster et al. | 719/327 |
| 6,967,728 B1 | * | 11/2005 | Vidyanand | 358/1.12 |

FOREIGN PATENT DOCUMENTS

EP 782068 7/1997

* cited by examiner

APPARATUS AND METHODS FOR TRANSFERRING PRINTER DRIVER PREFERENCES

REFERENCE TO RELATED APPLICATIONS

This application is a continuation of U.S. application Ser. No. 09/360,861, filed 23 Jul. 1999, now U.S. Pat. No. 6,967,728.

BACKGROUND

This invention relates to the field of printer driver preference systems. More particularly, this invention relates to apparatus and methods for transferring printer driver preferences across a network between client computers.

In the prior art, printer driver preferences are typically defined within an open file in an active application on a client computer, based upon the available print options for a currently chosen connected output device, such as a printer. The user selects from a varied list of selectable options within a printer driver preferences menu, pertaining to the file to be printed, and to the available options for the selected printer. Selected file specific options may be selected paper size (e.g., letter, legal, A4), reduction or enlargement, page orientation (e.g., vertical or horizontal), or font substitution. Specific printer options may be color quality, resolution enhancement, selected paper tray, and printing order.

The process of defining such printer driver preferences is typically complicated and time consuming, and has to be performed for most files to be printed (default printer driver preferences occasionally allow adequate printing of basic business documents, such as black and white text printing having a vertical orientation on letter size paper from a default paper tray).

In a work environment having more than one printer and more than one client computer, it is presently difficult and time consuming to define printer driver preferences repeatedly. A single user, having access to multiple client computers, commonly has to repeatedly configure one or more sets of printer driver preferences for each of the machines, even for the same document file. As well, for a business in which multiple users operate multiple client computers, there are often collaborative work projects which require a consistent format for portions of the project.

Russell et al. U.S. Pat. No. 5,611,046 ("Russell") discloses a circuit board coupled to a printer for interfacing the printer to a LAN. A bi-directional printer interface on the board transmits print data to the printer and receives printer status data from the printer. A processor on the board executes both application programs and status and control programs. Although Russell discloses a circuit board to couple a printer to a LAN to permit the printer to be "responsive, intelligent member" of a network, there is no disclosure of a the transfer, translation, modification or reuse of sets of printer driver preferences.

Brindle et al. U.S. Pat. No. 5,475,801 discloses a network "wherein a plurality of independent computers having various page description languages (PDL's) interface with a central computer through a plurality of lines, a system allows the user or administrator of a computer on each line to elect whether the line shall have the property of persistence of a PDL for all jobs coming through the line, or whether a new PDL shall be activated as necessary depending on the particular line."

Saulpaugh et al. U.S. Pat. No. 5,630,076 ("Saulpaugh") and Kathail et al. U.S. Pat. No. 5,802,365 ("Kathail") disclose a "method and mechanism for automatically correlating a device to its appropriate driver within a computer system utilizing candidate matching. A device tree indicating devices coupled to a computer system is available from an operating system. Within the device tree are device nodes which specify a particular device's name and a property which indicates compatible device names to the particular device. Drivers can include a data field indicating a driver name indicative of a corresponding device with which they operate. For a particular device, the system constructs a candidate list of drivers by comparing (1) the device name and 2) the compatible names from the device tree against all the driver names of data fields of known drivers." Although Saulpaugh and Kathail disclose methods and mechanisms for automatically correlating a devices to their appropriate drivers within computer systems, they fail to disclose the reuse or transfer of drivers within a networked environment. As well, they fail to disclose any translation of one or more preferences between drivers.

Motoyama et al. U.S. Pat. No. 5,353,388 discloses a document processing system which "controls the printing of documents represented in page description language form. Documents are represented by a page description language which is structured so that definition and declaratory commands are positioned only at the beginning of each distinct document segment."

Kageyama et al. U.S. Pat. No. 5,625,757 ("Kageyama") discloses a printing system having a plurality of terminal equipment, a plurality of printers that can be shared by the terminal equipment, and one or more printer/spooler control servers for receiving a print from the terminal equipment, and for controlling the print job by a printer. The system also includes a distributed printing management server, for various errors that occur in the printers. Although Kageyama discloses a networked printing system, print jobs are transferred through the print server.

Barrett et al. U.S. Pat. No. 5,647,056 disclose a method and apparatus for interfacing a peripheral to a LAN with an interactive network board connected to the peripheral device. An access management program establishes direct communication between a network client and the network board. The board may also execute a peripheral server program such as a print server.

In some recent prior art systems (such as Printer Driver Model No. CLJ8500, from Hewlett Packard Corporation, of Palo Alto Calif.), within a single computer, a user can store and retrieve a set of printer driver preferences, for a single output device. Although the set of printer driver preferences is storable and retrievable, the defined set is specific to a particular printer, and to a particular computer. For example, from within a word processing program, a user can navigate to a printer driver set up interface, select options, save the selected options as a defined set, and save the defined set. Subsequently, the user may selectively retrieve the saved defined set of printer driver options, from a different file within the same application on the computer, or from another application on the same computer.

As a further example, a user may store a printer driver preference set for a document design, designating document specific options, and printer specific options to produce the document. Within the application in which the user creates the document design, upon creating a set of printer driver preferences, the user may save the settings (e.g., "My Document Settings"). The user may then retrieve those options within the same computer, and use the retrieved set to print a different file, such as a new document file, at the same destination printer.

However, there are currently no means by which one or more sets of printer driver preferences can be directly transferred or reused between client computers. It would be advantageous to provide a system by which a user can define a set of printer driver preferences at a first client computer, and then transfer the defined set of printer driver preferences across a network, such as to another client computer, a printer, a print server, or other network device. As well, it would be advantageous to selectively retrieve a set of printer driver preferences for a first printer, and use or modify the set, as necessary, as a set of printer driver preferences for a different printer.

When a user creates a set of printer driver preferences, such as for a type of printed document that the user commonly creates (e.g., a horizontal format transparency), the user often has to recreate the same set of printer driver preferences when creating another similar document. It would therefore be advantageous to reuse the same set of printer driver preferences. It also would be advantageous to provide a method to transfer printer driver preferences across a network, and provide a method to merge or modify transferred printer driver preferences, or to create new sets of transferable printer driver preferences. Although the disclosed prior art systems and methodologies provide basic printer driver preference systems, they fail to provide transferable, reusable, and modifiable sets of printer driver preferences. The development of such a transferable printer driver preference system would constitute a major technological advance.

SUMMARY

A system is provided for supporting multiple platforms with common personal preferences for printer drivers. The set of preferences for the printer driver are therefore reusable and may be moved from one printer driver to another. The system involves the provision of a common format for printer driver preferences. When a new printer is brought into a system, or when a user moves to a station that uses a different printer, the preferences are readily moved to that location. Further, in a networked environment were a plurality of computers operate in collaboration, an MIS department may provide a corporate wide printer preference solution, for example printing a particular page or printing in a particular style. Although preferences may not be identical for each printer, due to differences in the capabilities of various platforms, the system typically translates preferences between different printers, to the extent that each printer has the different options available. To the extent that one or more options within a set of preferences are not available at a destination printer, the system typically reverts to default settings for the destination printer, or allows the user to selectively modify the set of preferences.

DETAILED DESCRIPTION

Figure 1:
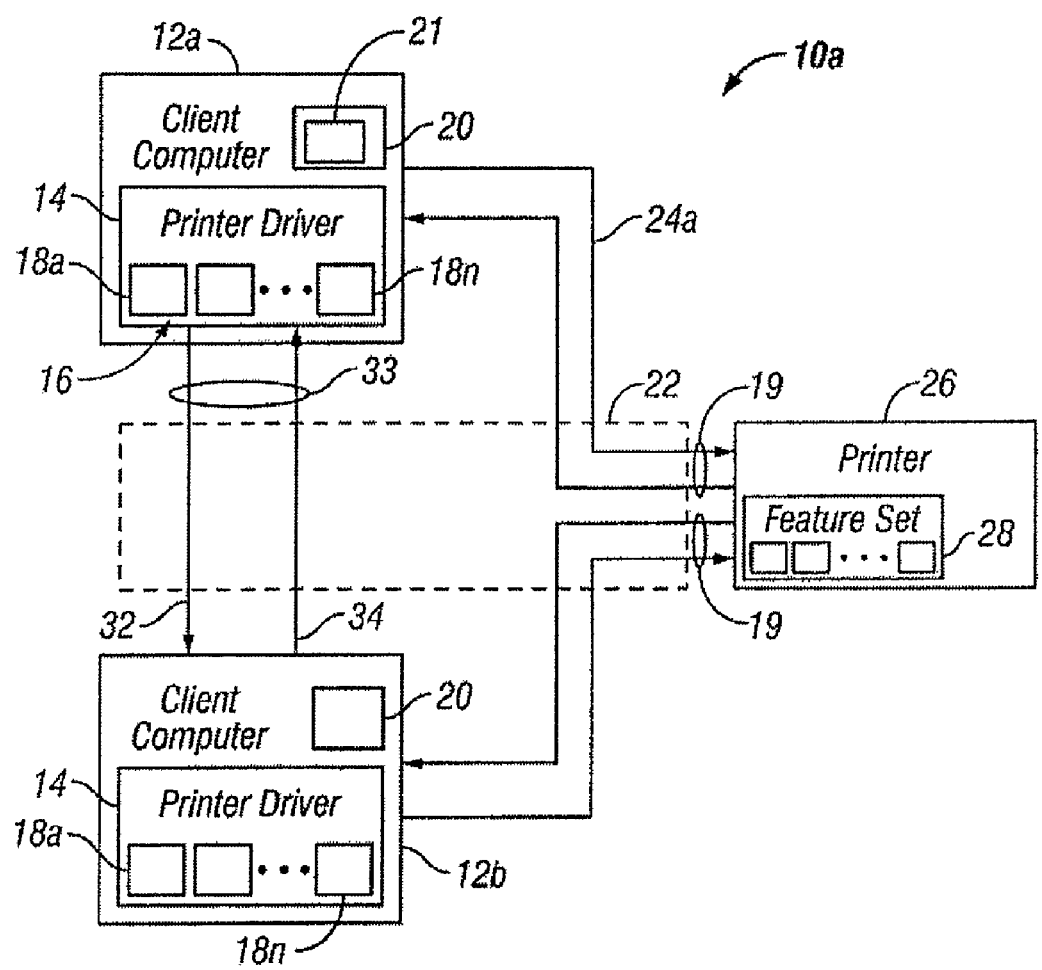
FIG. 1 is a block diagram of a reusable and transferable printer driver system, wherein a set of printer driver preferences is transferable between client computers.

FIG. 1 is a block diagram of a reusable and transferable printer driver system 10a, wherein a set 16 of printer driver preferences 18a-18n is transferable 32 between a first client computer 12a and a second client computer 12b. The client computers 12a, 12b are connected across a network 22 to each other (e.g., such as through computer network connections 33), and to a printer 26 (e.g., such as through printer network connections 19). The set 16 of printer driver preferences 18 is used by the first computer 12a to define a printing process at the connected printer 26, such as when sending 24a a print job 21 from an application 20 to the printer 26.

In the embodiment shown, a first set 16 of printer driver preference settings 18 is located on the first client computer 12a. The set 16 of printer driver settings 18 is sent 32 from the first client computer 12a to one or more other client computers (e.g., client computer 12b), across the network 22. The transfer of sets 16 of preferences 18 between computers 12 can be accomplished by several means, such as file transfers, direct transfers, e-mail, or by any other electronic export 32 or import 34 methods. The network 22 between connected devices, such as client computers, may be any sort of direct connection, or may even be a wireless or PSTN based connection, such as an Internet or intranet connection.

Although the set 16 of printer driver preferences 18 is defined before being sent to the second client computer 12b, the preference set 16 provides a valuable resource to a user at the second client computer 12b. A significant portion of a set 16 of printer driver preferences 18 often relates to a characteristic feature set 28 of a connected output device (e.g., a printer 26). As well, many printer driver preferences 18 are similar between similar print jobs 21, such as defined color attributes for documents produced at one or more client computers 12a, 12b. Therefore, although a single set 16 of printer driver preferences 18 may take considerable time for a user to initially create (such as at the first client computer 12a), it is often advantageous to reuse all or part of a previously defined set 16 of printer driver preferences 18 (such as at a second client computer 12b).

Figure 2:
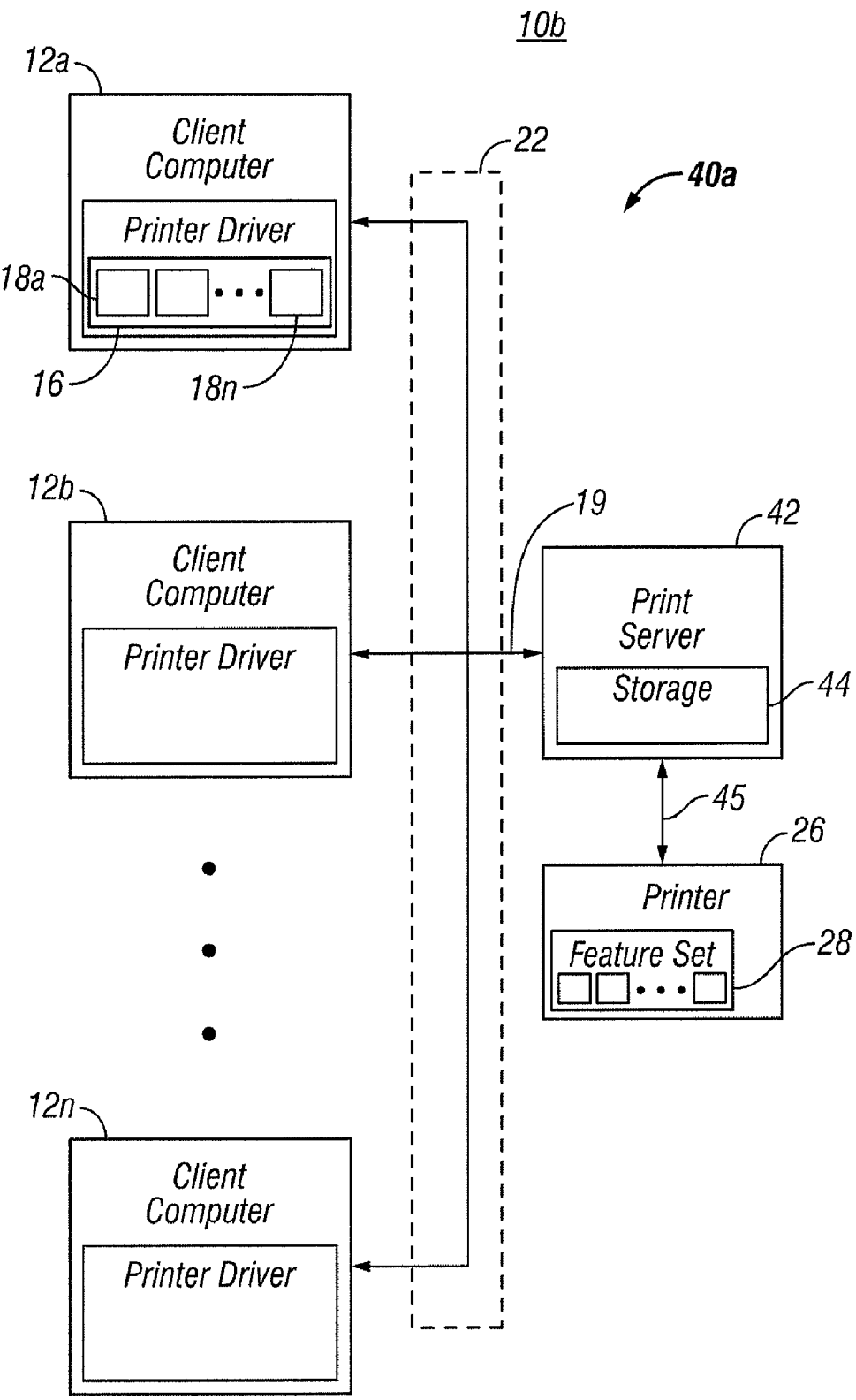
FIG. 2 is a second embodiment of a reusable and transferable printer driver system, in which a plurality of client computers are connected across a network to each other and to a print server, and wherein a set of printer driver preferences is located on a first client computer.

FIG. 2 is a first view of 40a of a second embodiment of a reusable and transferable printer driver system 10b. A plurality of client computers 12a-12n are connected across a network 22, to each other, and to a print server 42, having storage 44, which is connected 45 to a printer 26. In the embodiment shown in FIG. 2, the set 16 of printer driver preference settings 18 is initially located on a first client computer 12a. For example, a user at the first client computer 12a may define a detailed set 16 of printer driver preference settings 18, in the course of sending print jobs 21 (as shown in FIG. 1) to the print server 42 for printing at the printer 26.

Figure 3:
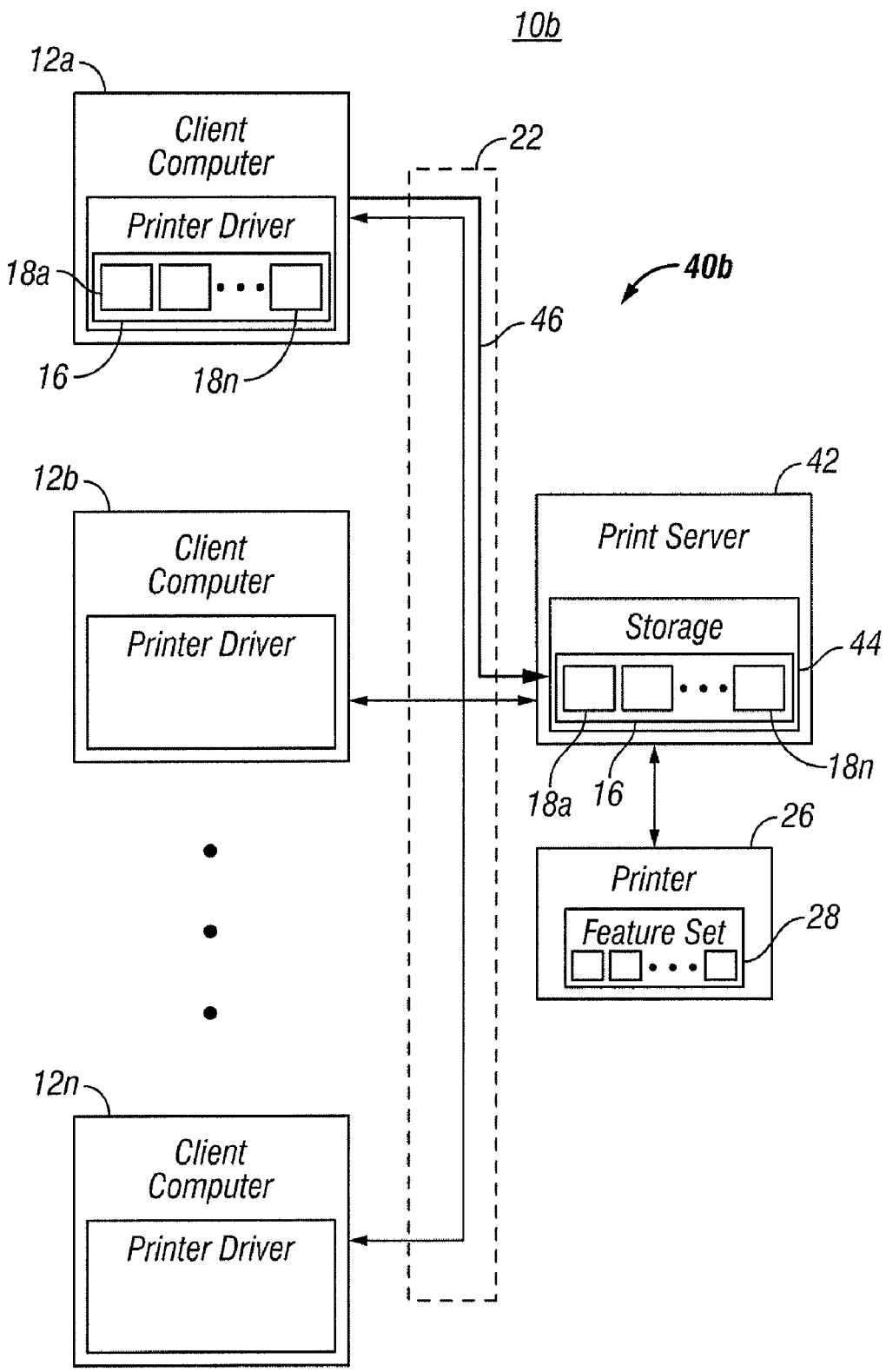
FIG. 3 is a second view of the reusable and transferable printer driver system of FIG. 2, in which the set of printer driver preference settings is sent from the first client computer to the print server.

FIG. 3 is a second view 40b of the second embodiment of a reusable and transferable printer driver system 10b shown in FIG. 2, in which the set 16 of printer driver preference settings 18 is downloaded 46 from the first client computer 12a, across the network 22, and is stored within storage 44 of the print server 42. As described above, a significant portion of a set 16 of printer driver preferences 18 often relates to a characteristic feature set 28 of the connected output device (e.g., the printer 26), and many client computers 12a-12n connected across a network 22 often have print jobs 21 (as shown in FIG. 1) which require similar preferences 18. Therefore, the stored set 16 of printer driver preference settings 18 is often useful for other client computers 12b-12n.

Figure 4:
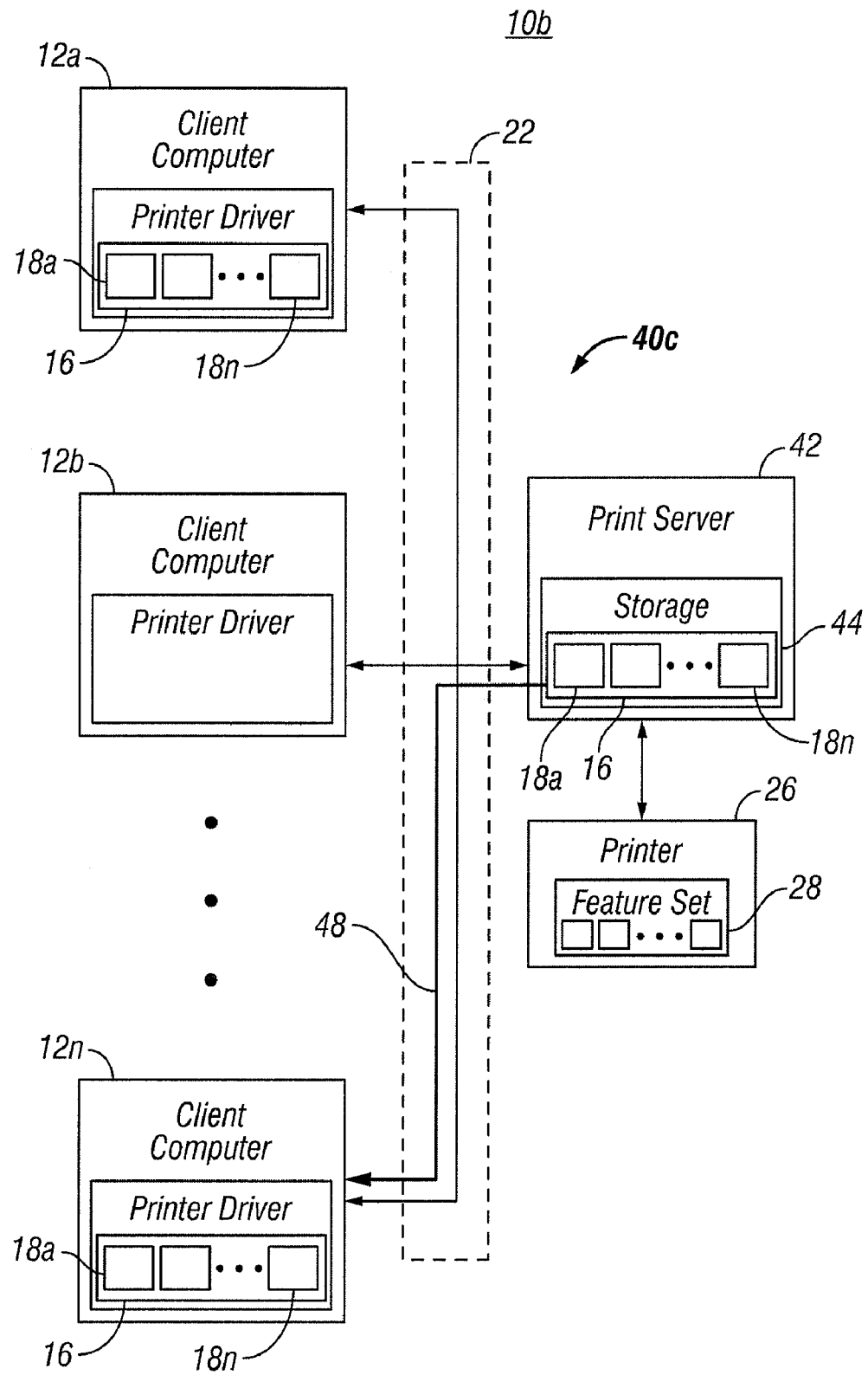
FIG. 4 is a third view of the reusable and transferable printer driver system of FIG. 2, in which the stored set of printer driver preference settings is distributed to other client computers.

FIG. 4 is a third view 40c of the second embodiment of a reusable and transferable printer driver system 10b shown in FIG. 2, in which the stored set 16 of printer driver preference settings 18 is then sent 48 (i.e., distributed or selectably uploaded) from the print server 42 to other client computers 12b, . . . 12n. The uploaded set 16 of printer driver preference settings 18 is subsequently used by the other client computers 12b, . . . 12n in the process of printing files 21 (as shown in FIG. 1) at the printer 26 connected to the print server 42.

Figure 5:
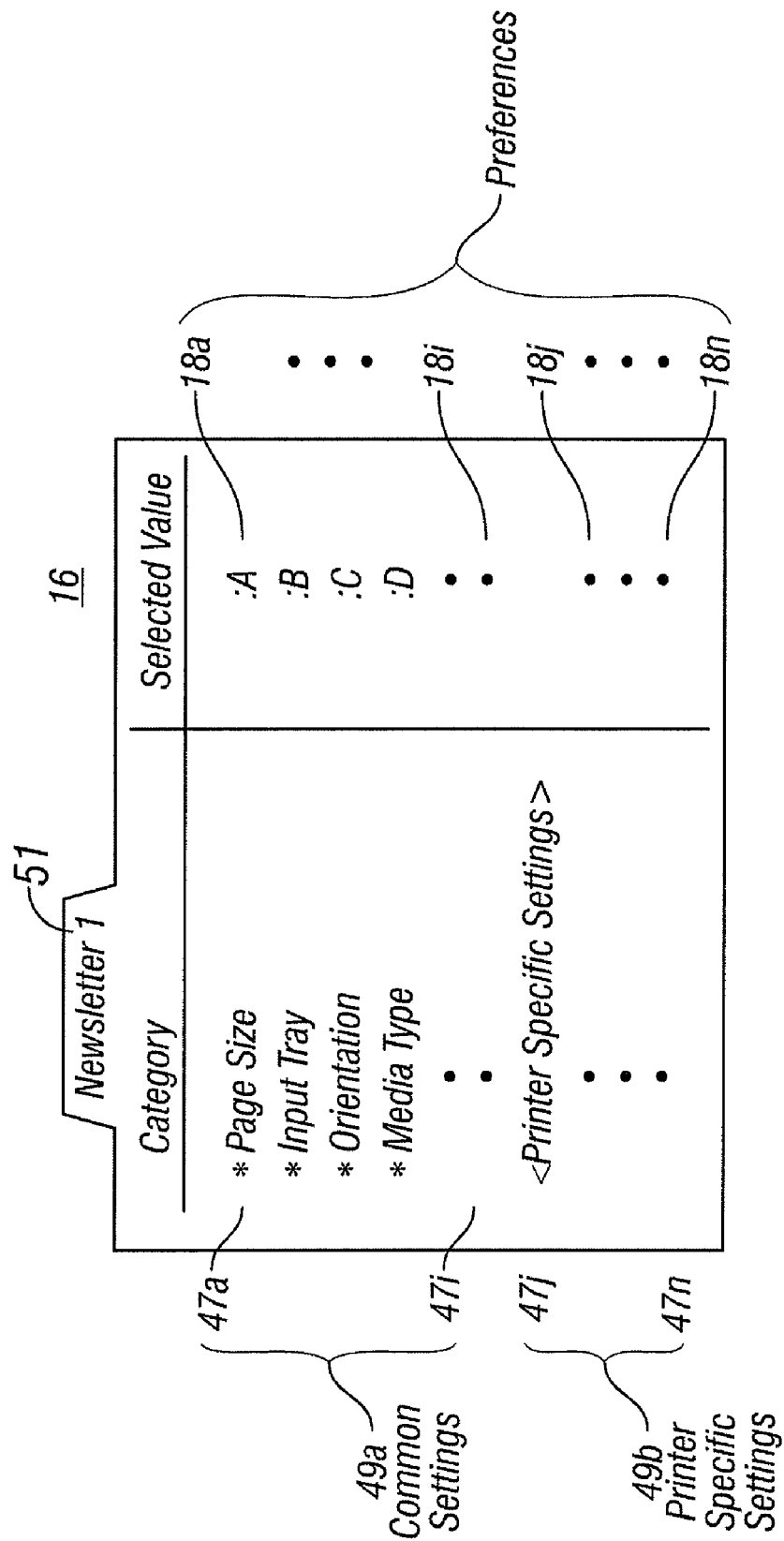
FIG. 5 shows a set of selected printer driver preference values, based upon printer driver categories.

FIG. 5 shows a set 16 of selected printer driver preference values 18a-18n, based upon printer driver categories 47a-47n. The set 16 of printer driver preferences 18a-18n are set values which are required to successfully print a print job 21 (as shown in FIG. 1) at a networked printer 26. Within the entire set of printer driver categories 47a-47n is typically a common category subset 49a of settings 47a-47i which are common to most printers 26 (e.g., such as selected page size, input tray, orientation, and media type). As well, within the entire set of printer driver categories 47a-47n is typically a printer specific subset 49b of settings 47j-47n which are specific to a particular printer 26, based on the feature set 28 (i.e., the capabilities) of that printer 26 (e.g., duplex, sorting, finishing options). A specified reusable and transferable set 16 of printer preferences 18 typically includes a set name 51 (preferably user-selectable or MIS department selectable), which allows users at different client computers 12a-12n to easily identify and use one or more sets 16 of printer preferences 18 for different print jobs 21.

Figure 6:
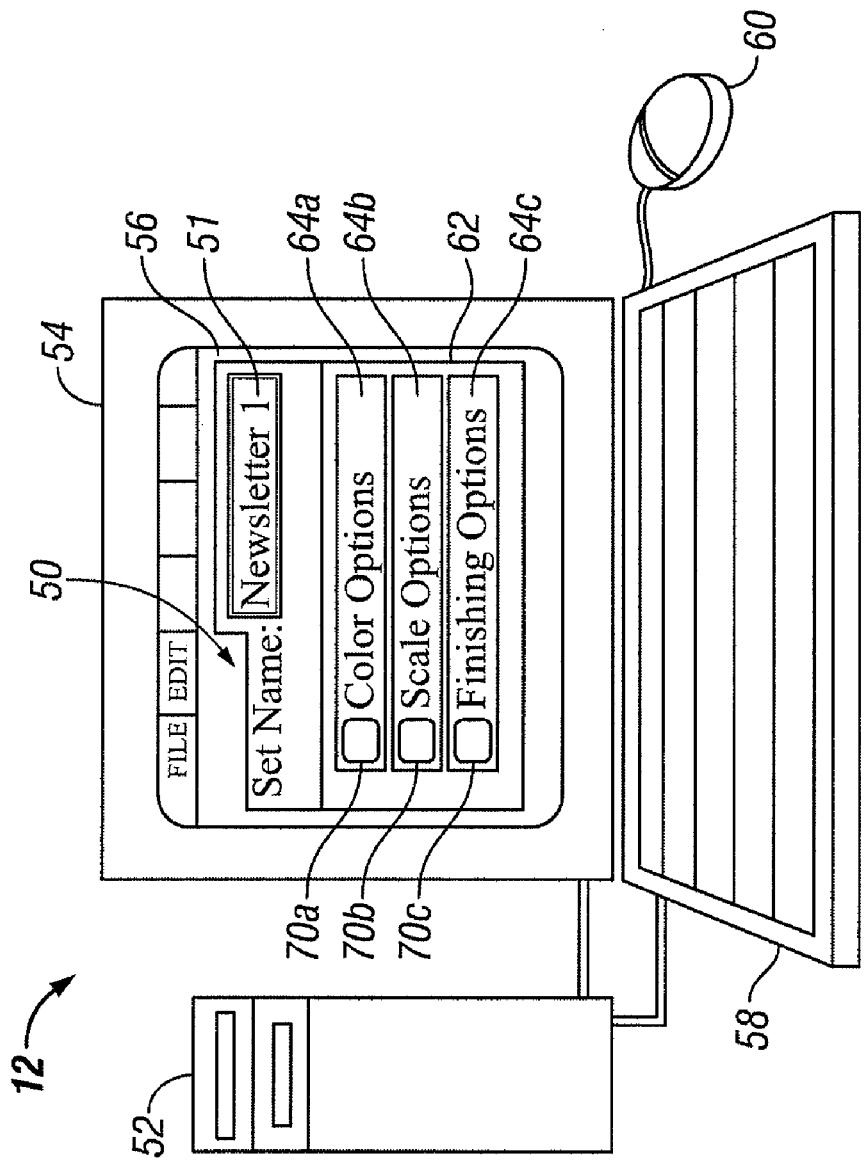
FIG. 6 is a schematic view of a user interface of a printer driver for reusable and transferable printer preferences, located on a client computer.

FIG. 6 is a schematic view of a user interface 50 for a printer driver 14 for the reusable and transferable printer preference systems 10a and 10b (described in reference to FIGS. 1, 2, 3, and 4 above), located on a client computer 12.

Figure 11:
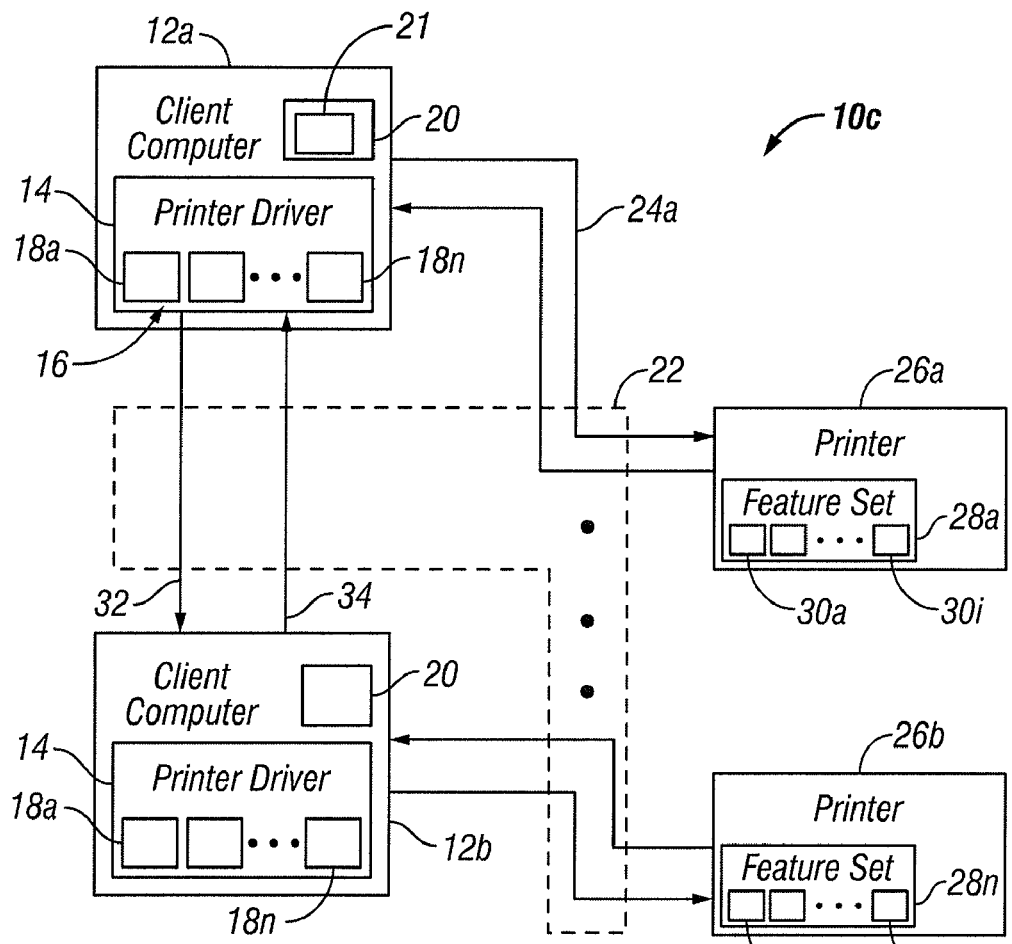
FIG. 11 shows a multiple printer embodiment of the transferable and reusable printer preference system.

The client computer 12 typically comprises a processing unit 52, a monitor 54 having a display screen 56, and input devices, such as a keyboard 58 and a mouse 60. Within the user interface 50 of the printer driver 14 (as shown in FIG. 1), a user views, defines or modifies a set 16 of selectable printer driver preferences 18. In basic embodiments of the reusable and transferable set of printer preferences systems 10a and 10b (described in reference to FIGS. 1, 2, 3, and 4 above), the user interface 50 allows sets 16 to be defined and reused for a particular connected printer 26. However, preferred embodiments of the systems 10a and 10b (described in reference to FIGS. 1, 2, 3, and 4 above) allow sets 16 of transferable printer preferences 18 to be readily defined, transferred and modified for use with different printers 26, and even for different printers 26 having different feature sets 28a-28n (FIG. 11).

The user interface 50 has a general settings interface 62, providing a general set of all the preferences 18 which the user can specify. The user interface 50 preferably includes a set name interface, in which a user may enter a desired name 51 (e.g., "Newsletter 1") for a given set 16 of preferences 18, such as by using the keyboard 58. The top level settings 64a-64c typically include setting group controls, such as for color options 64a, scale options 64b, and finishing options 64c.

Figure 7:
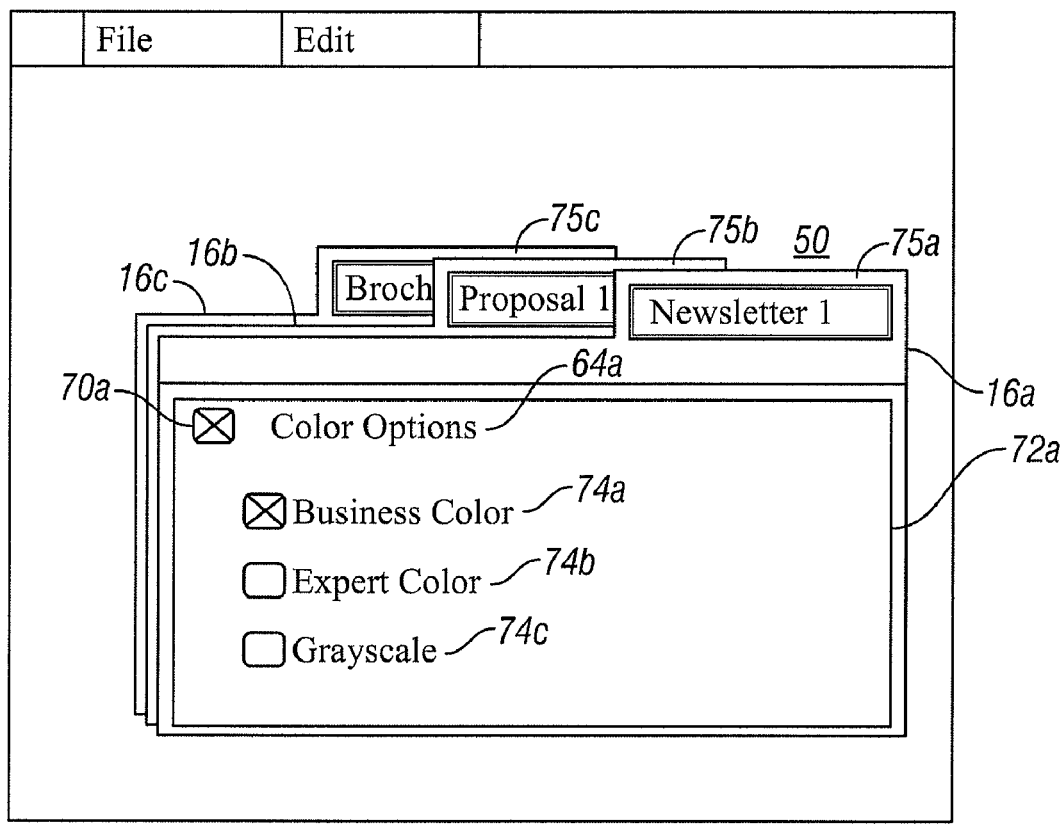
FIG. 7 is detailed view of a user interface for a printer driver for the reusable and transferable printer preference system.

When the user activates a general setting choice, such as activating a group button 70a, 70b, or 70c, the user interface 50 typically displays a related preference selection window or expanded submenu 72a, as shown in FIG. 7, whereby the user may specify detailed preference settings 18. In FIG. 7, the user has activated the expanded color settings submenu 72a by selecting the color setting button 70a in FIG. 6. The color settings submenu 72a includes detailed selectable color settings. For color settings, typical option groups of preferences are business color 74a, expert color 74b, or grayscale 74c. For example, business color 74a is typically defined by preset color preferences 18, wherein the user interface 50 specifies basic color settings (e.g., typically specifying an adequate color palette that is reproducible by a color printer 26 for general business documents). As well, basic grayscale printing output 74c may be selected.

In contrast to more generic grayscale settings or business color settings 74a, expert color output 74b may optionally be selected, whereby a user has the option to manually specify more detailed color settings (e.g., such as for color calibration and specified PANTONE™ color matching (by Pantone Incorporated, of Moonachie, N.J.)). In FIG. 7, if expert color output 74b is activated, a secondary submenu would typically be presented to the user within the user interface 50, so that the user may select detailed expert color preferences 18.

In a similar manner to the selection of color preferences 18, other preferences 18 may be selected within the user interface 50, such as printing media selection (e.g., substrate type selection, such as paper or transparency, tray selection, and paper size selection), or other processing preferences, such as finishing, orientation, duplex, stapling, binding, and/or hole punching preferences.

The user interface 50 shown FIG. 7 also includes a graphic representation of a plurality of defined sets 16a-16c of printer preferences 18. The currently displayed set 16 is selectable, such as by activation of layered sets 16 by tabs 75a-75c. For example, the displayed set 16a is currently displayed in FIG. 7. When a user selects a preference set tabs 75a-75c, the selection windows for the selected set 16 is displayed, and presents the selected preference options to the user, such as a detailed set view (FIG. 5), a general control interface 62 (FIG. 6), or more specific option submenus 72a (FIG. 7).

The resulting set 16 of printer preferences 18 is based upon the chosen preference 18 for each setting 47 (FIG. 5). A user may create a plurality of sets 16a-16n of preferences 18, typically for different types of print jobs 21, from within the printer driver control interface 50. Although a user may create a set 16 of preferences 18 by individually selecting each preference 18, the user may also modify a previously defined set 16 (e.g., modifying the selected preferences 18 for "Newsletter 1"), or may modify a previously defined set 16 and save the modified set as a new set 16 (e.g., modifying the selected page size and finishing preferences 18 for "Newsletter 1" and retaining the color preferences for "Newsletter 1," and saving the modified set 16 as "Proposal 1").

In this example, different print jobs 21 created by one or more client computers 12a-12n, using either the first set 16a, named "Newsletter 1," or the second set 16b, named "Proposal 1," may quickly be processed. For detailed print jobs 21, such as where color preferences 18 are quite complicated, the resulting print jobs 21 may be processed with strict color preferences 18, whereas other printer preferences 18 may differ. For example, a newsletter print job 21 commonly involves a two-page, two-sided folded layout, whereas a business proposal print job 21 is commonly printed on single-sided letter size paper. However, related documents often incorporate coordinated color palettes. The reusable and transferable printer preference systems 10a and 10b (described in reference to FIGS. 1, 2, 3, and 4 above), thus allows sets 16 of preferences 18, or portions of sets 16 of preferences 18 to be efficiently and accurately defined, transferred, and modified.

Figure 8:
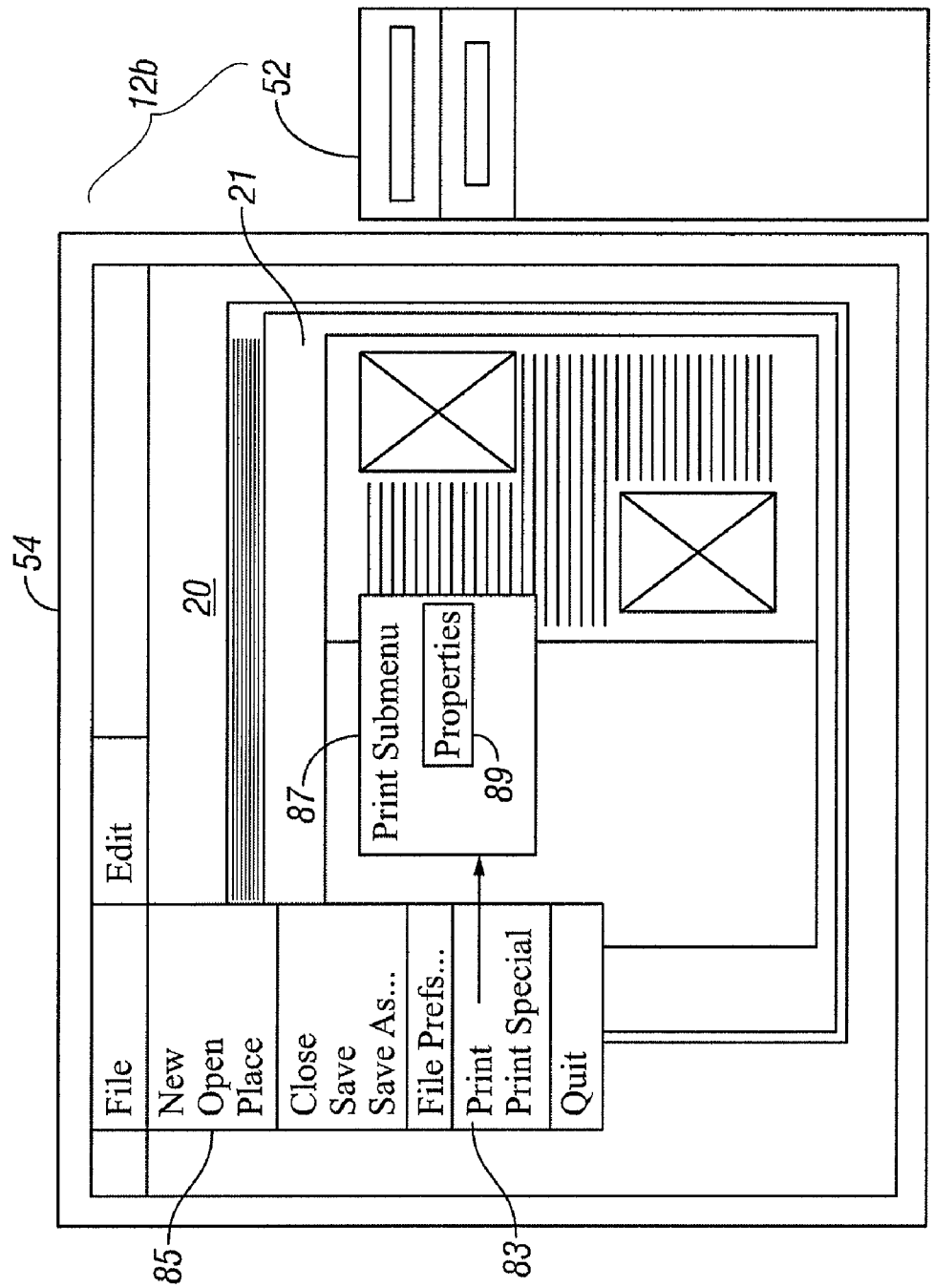
FIG. 8 is a schematic view of an active application on a client computer linked to a printer driver for reusable and transferable printer preferences.

FIG. 8 is a schematic view of an active application 20 on a client computer 12, which is linked to a printer driver 14 for reusable and transferable printer preferences 18. Within the active application 20, the user typically accesses the transferable printer preference systems 10a or 10b through the a print control 83 on a file submenu 85. Selection of the print control 83 typically displays a general print submenu 87 from within the active application 20, wherein a print properties control 89 within the general print submenu 87 provides access to the general settings interface 62 (as shown in FIG. 6) of the transferable printer preference systems 10a or 10b.

Figure 9:
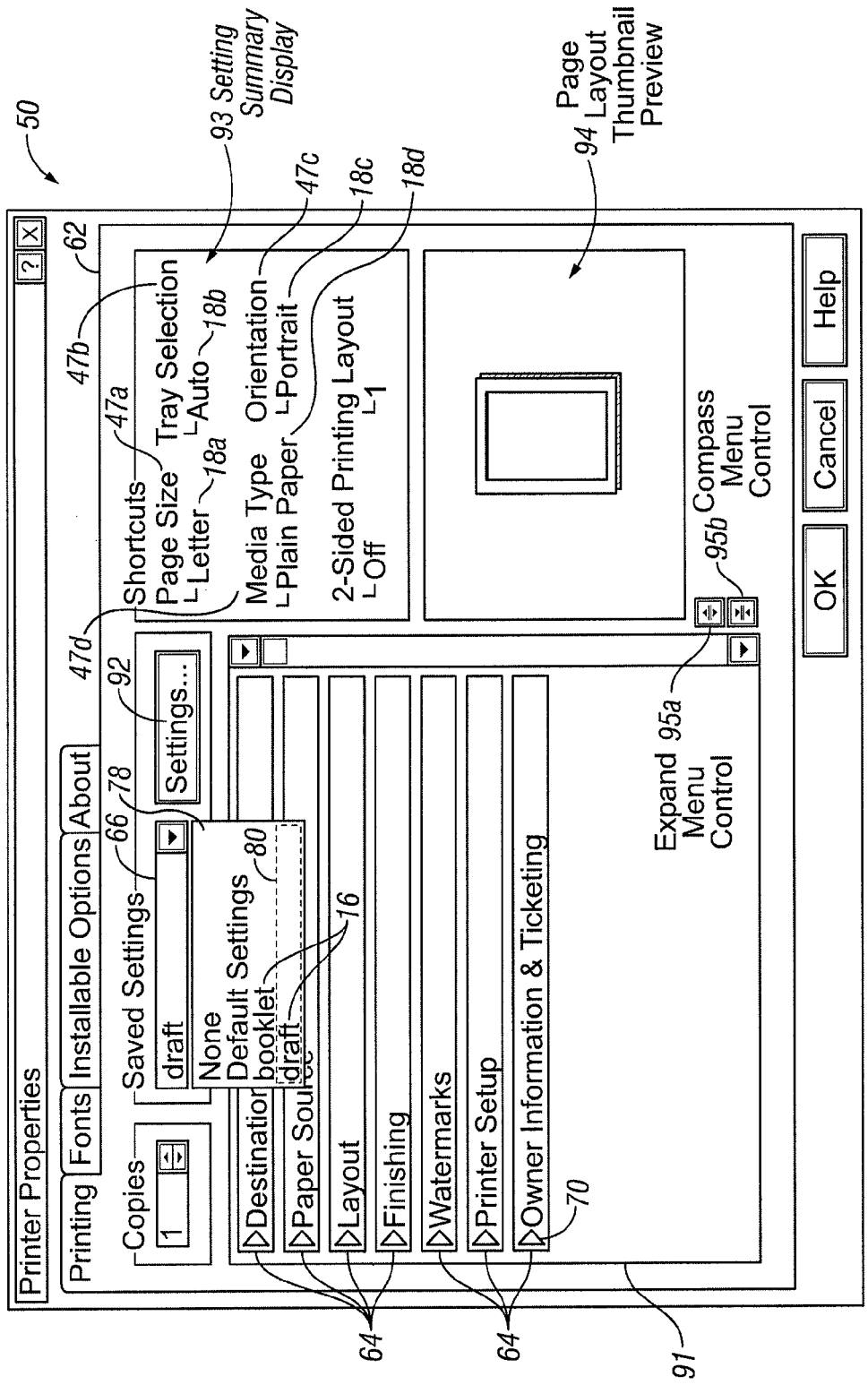
FIG. 9 is a detailed view of a user interface for a printer driver for the reusable and transferable printer preference system linked to an active application on a client computer.

FIG. 9 is a detailed view of a user interface 50 for a printer driver 14 for the reusable and transferable printer preference systems 10a or 10b linked to an active application 20 on a client computer 12. When the user selects a defined set 16 from a set selection submenu 78, such as by highlighting 80 the desired set 16, the selected preferences 18 are changed to reflect the defined preferences 18, and the user may quickly process a print job 21. The general settings interface 62 includes an expandable preferences display 91, which can be expanded by expand menu control 95a, or compressed (showing only top level settings), by compress menu control 95b. When the user activates a general setting choice 64, such as activating a group button 70, the control interface 50 typically displays a related preference selection window or expanded submenu shown as 72a, in FIG. 7, whereby the user may specify detailed preference settings 18.

The general settings interface 62 also preferably includes a setting summary display 93, and a page layout thumbnail preview 94. The setting summary display 93 provides an overview of printer driver categories 47a-47n, as explained in FIG. 5 and selected settings 18a-18n for the current set 16 of preferences 18. The page layout thumbnail preview 94 provides a graphic representation of the current page layout, as a print job would be printed to an output device 26 (e.g., the graphic representation in FIG. 9 currently shows a portrait orientation setting 18c on letter size paper setting 18a, as shown in setting summary display 93).

Figure 10:
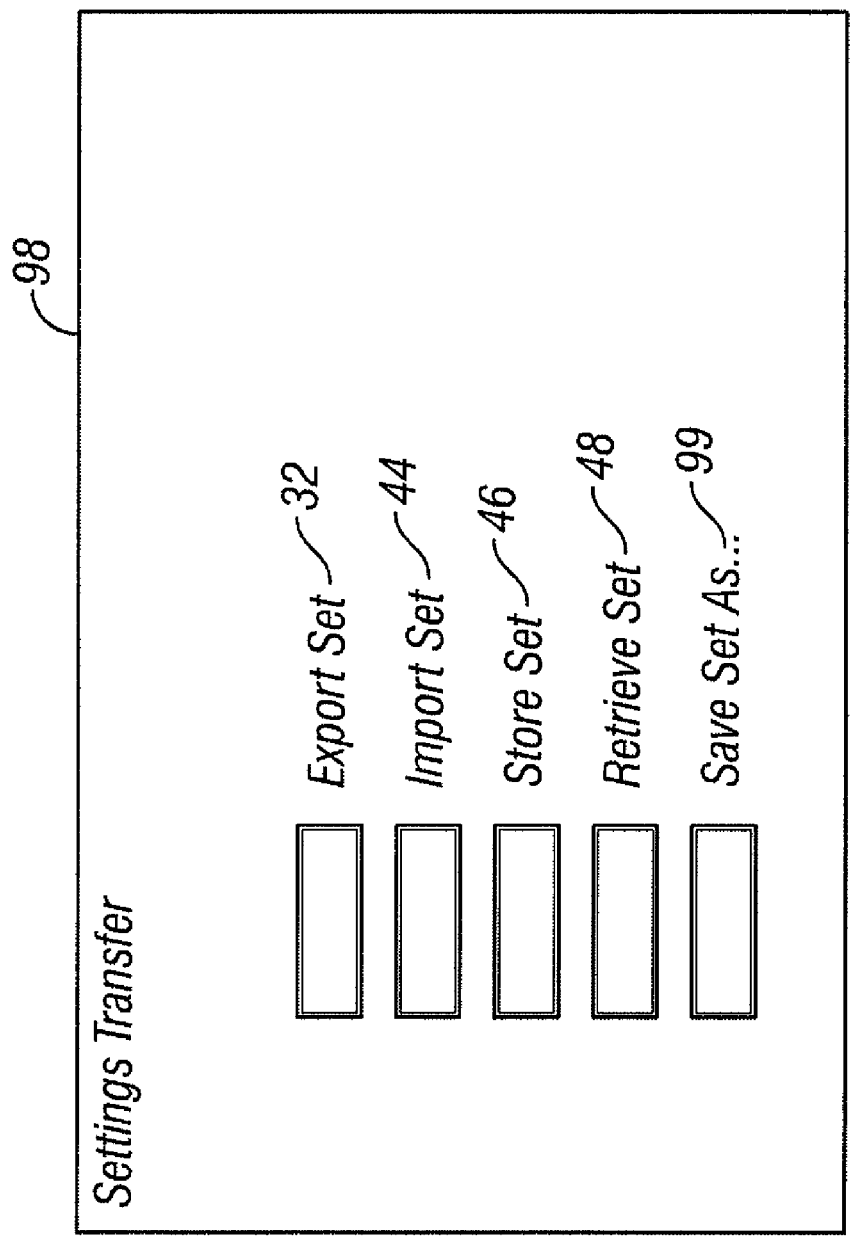
FIG. 10 is a settings submenu of a user interface for a printer driver for the reusable and transferable printer preference system linked to an active application on a client computer.

The general settings interface 62 also includes a settings selection control 92, which provides access to a detailed settings submenu 98, wherein a user can control the transfer of sets 16 of printer preferences 18. FIG. 10 is a settings submenu 98 of a user interface for a printer driver 14 for the reusable and transferable printer preference systems 10a or 10b linked to an active application 20 on a client computer 12. The settings submenu 98 includes controls for exporting 32 (FIG. 1) a selected set 16 of printer preferences 18, importing 34 (FIG. 1) a selected set 16 of printer preferences 18, storing 46 a selected set 16 of printer preferences 18 (FIG. 3), retrieving 48 a selected set 16 of printer preferences 18 (FIG. 4), or saving a selected set 16 of printer preferences 18 as a new set 16, through Save As control 99.

Within a network 22, transferable and reusable sets 16 may therefore be defined at one or more client computers 12a-12n, and may be distributed to other networked devices, such as to client computers 12a-12n or to print servers 42. For users located at a plurality of client computers 12a-12n, the distributed sets may readily be used, such as for multiple users working on one or more related project. Each user may send each project (i.e., a print job 21) to a printer 26, and obtain similar printed outputs, since the set 16 of printer preferences 18 is equivalent across all client computers 12a-12n.

System Use for a Plurality Printers having Different Feature Sets. In basic embodiments of the transferable and reusable printer preference systems 10a or 10b, sets 16 of printer driver preferences 18 can be transferred between multiple client computers 12a-12n for jobs which are sent to the same printer 26. In preferred embodiments, sets 16 of printer driver preferences 18 are used to send print jobs 21 to different printers 26a-26n, either from the same client computer 12, or from different client computers 12a-12n. Although sets 16 of printer preferences 18 are typically specified in terms of an available feature set 28 for a connected printer 26 (e.g., a first printer 26a), the sets 16 may be modified within the transferable and reusable printer preference systems 10a or 10b to function with different printers 26a-26n having different feature sets 28a-28n.

FIG. 11 shows a multiple printer embodiment of the transferable and reusable printer preference system 10c, having a first client computer 12a in communication with a first printer 26a, and a second client computer 12b in communication with a second printer 26b. The set 16 of printer preferences 18 shown is defined on the first client computer 12a, and is specified to perform a particular type of print job 21 at the first printer 26a. As described above, a user at the first client computer 12a may selectably send 32 one or more sets 16 of printer driver preferences 18 to the second client computer 12b. The transfer or distribution of sets 16 may be accomplished by several means, such as by e-mail, or by intermediate storage on a server (e.g., such as print server 42 (FIGS. 2-4)).

Figure 12:
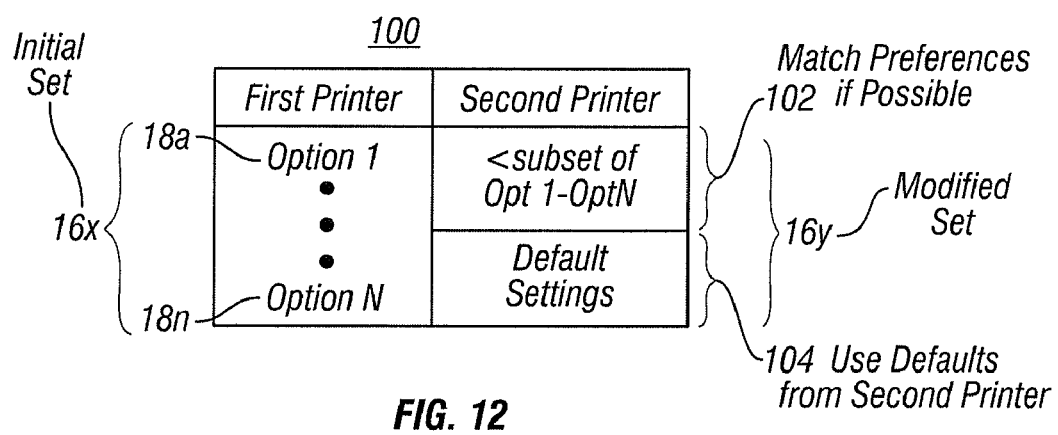
FIG. 12 is a translation diagram typically used by the multiple printer embodiment of the transferable and reusable printer preference system.

Translation of Set Preferences. FIG. 12 is a translation diagram 100 typically used by the multiple printer embodiment of the transferable and reusable printer preference system 10c. When an initial set 16x of preferences 18, having been specified for use at a first printer 26a having a first feature set 28a, is used to print a print job 21 at a different printer 26b, as shown in FIG. 11, having a different feature set 28n (sent from either the same computer 12a or a different computer 12b), the system 10c preferably modifies the initial set 16x of preferences 18 to create a modified set 16y, as needed, to accomplish the selected print job 21.

The multiple printer platform printer driver 14, as shown in FIG. 11 preserves the defined preferences 18 which are usable 102 for a different destination printer 26b. Although the application 20 and multiple platform printer driver 14 preserves as many preferred settings 18 as possible (e.g., retains the main code of the initial set 16x, there are often features 30a . . . 30i and 30a . . . 30k, as shown in FIG. 11 which are different between different printers, and preferences specified in an initial set 16x which are not directly usable for a new destination printer 26b. For preferred preferences 18 which are not directly usable for the destination printer, the printer driver 14 uses default setting preferences 104 that are required to successfully print to the second printer 26b.

For example, a common printer preference 18 may be "duplex" printing. For different printers 26b which have a "duplex" printing preference 18 available within each their defined feature sets 28, the printer driver 14 and translation control 100 matches 102 the "duplex" option 18. Meanwhile, other non-matching settings 104, which are not directly available to the new printer 26b, are typically translated to default preferences 18 for the new destination printer 26b. In a preferred embodiment, where more than one default setting preference is possible at a destination printer 26b, translation control 100 provides controllable selection of the default preferences 104.

Conflict Resolution. When translating sets 16 of printer preferences 18, or when merging sets 16 of printer preferences 18 (FIG. 14), there are occasionally selected features from one set 16 which are not directly translated to an available selectable preference 18, or an available feature 28 on a different output device 26b. Therefore, when sets 16 of reusable and transferable printer preferences 18 are imported to a client computer 12, retrieved from external storage 44 across a network, or are used to send a print job 21 to a different printer 26b than a set 16 was originally intended, detailed resolution between preferences 18 is sometimes required.

Figure 13:
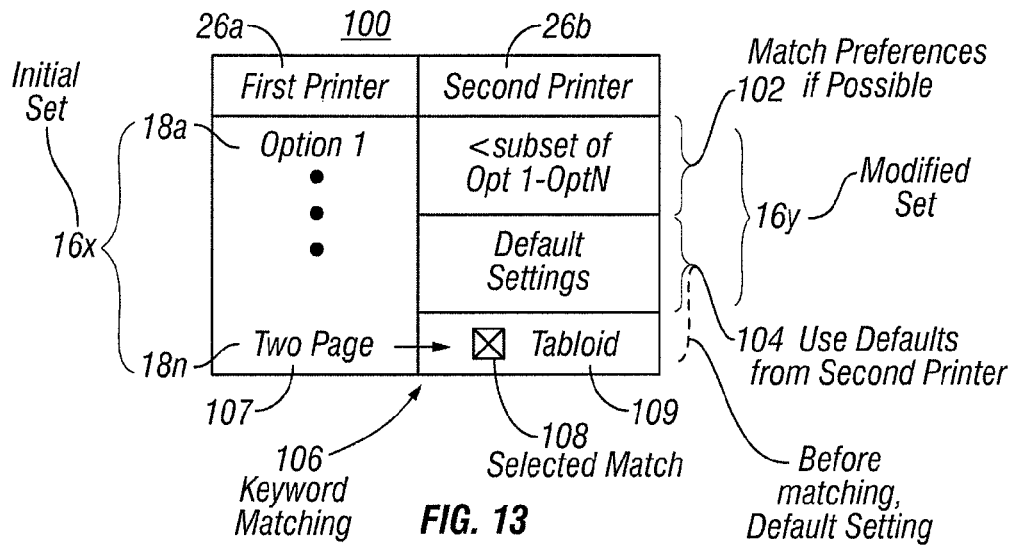
FIG. 13 shows keyword matching between different sets of printer preferences.

Each set 16 includes a plurality of defined preferences 18, and each preference has a defined preference name or keyword 107 as shown in FIG. 13. Although there may be equivalent or similar features 30a . . . 30i, as shown in FIG. 11 within feature sets 28 of different printers, the terminology 107 used to describe a preference 18 related to each feature 30a . . . 30i, as shown in FIG. 11 may be different for different printers 26b. The printer driver 14 and translation control 100 attempts to match as many preferences as possible, substitutes default setting 104 where possible (FIG. 12), and if needed, allows the user to match other non-matching preferences 18, to correctly match preferences 18 which were incorrectly matched by the automated system (e.g., such as from differences in keywords 107), or to resolve other conflicts.

The translation and modification of sets 16, and comparison between preferences 18 and keywords 107 is accomplished internally to the printer driver application 14. Alternatively, supplementary translation format applications, such as an XML format application, may be used in conjunction with the printer driver 14, such as to store and transfer setting parameters 47a-47n and their values 18a-18n within a standardized XML format, and to compare and translate parameters 47, keywords 107, and preference values 18. The use of XML formats provides simple key value pair association describing the settings 18 for a specific printer 26. The transfer of settings 18 in XML format is preferred, since there are no additional page description language (PDL) specific commands that are required.

Keyword Matching. Common features 30a . . . 30i, as shown in FIG. 11 are often described using the same terminology preferences 18 for different printers 26b manufactured by the same company (e.g., using unified terminology and keywords for features 30a . . . 30i, as shown in FIG. 11 and selectable preferences 18). However, an equivalent or similar feature 30a . . . 30i, as shown in FIG. 11 provided on a printer 26 from a different manufacturer may have different terminology or keywords for features 30a . . . 30i, as shown in FIG. 11 and selectable preferences 18.

The multiple platform printer driver 14 and translation control 100 therefore preferably provides keyword matching controls, whereby a user can match up preferences 18 between an initial set 16x (FIG. 12), and non-matching 104 preferences 18 in the modified set 16y.

FIG. 13 shows keyword matching 106 between different sets 16 of preferences 18. Through the user interface 50 or translation control interface 100, a user may optionally resolve such conflicts in terminology by matching key words 107. For example, as shown in FIG. 13, a first set 16x of preferences 18a . . . 18n is defined for a first printer 26a, and describes a page layout option as "Two-page" 107. However, the second printer 26b shown requires a similar layout option to be described as "Tabloid" 109. In this scenario, the user may optionally resolve the conflict, by matching 108 the "Two-page" keyword 107 for preference 18n in the first set 16x to the "Tabloid" keyword 109 for preference 18n in the modified set 16y.

Figure 14:
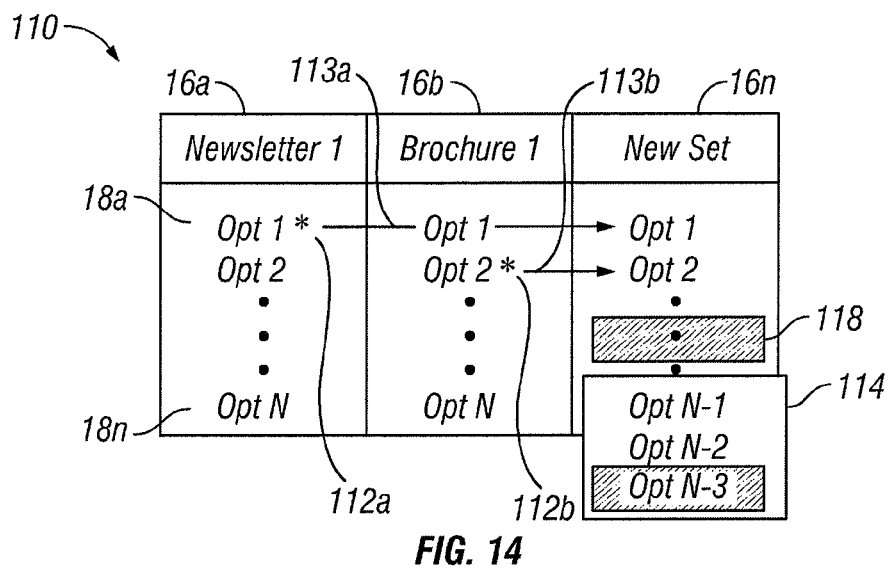
FIG. 14 shows selective merging of selected preferences between a plurality of sets of reusable and transferable printer preferences to create a new set of reusable and transferable printer preferences.

Selective Merging. FIG. 14 shows selective merging 110 of selected preferences 18 between a plurality of sets 16a, 16b of reusable and transferable printer preferences 18, to create a new set 16n of reusable and transferable printer preferences 18. For example, a user may desire to create a new set 16n, based on specific color preferences 18 from an earlier defined set (e.g., set 16a), and may also desire finishing preferences 18 based on a different set (e.g., set 16b)

The selective merging window 110 allows a user to choose selected preferences 18 between two or more previously defined sets, to create a new set 16. Within the selective merging window 110, the user highlights 112a, 112b desired preferences 18 from existing sets 16a, 16b. In an alternate embodiment, a user can slide over (i.e., drag) 113a the desired preferences 18 or groups of preferences (e.g., color output settings 18) from the first set 16a to the new set 16n, and slide over 113b the desired preferences 18 or groups of preferences (e.g., finish settings) from the second set 16b to the new set 16n.

The user may also select other preferences 18 based upon choices other than those available, such as by a pop-up menu 114 of preferences 18. The user may then save and use the new set 16n, as merged from two or more prior sets, and may optionally modify the preferences 18 for the new set 16n, by selecting preferences 18 from selection menus.

Translated or selected preference options 18 which conflict with other selected preferences 18 in the new set 16n (i.e., the selected preference is not available, or cannot be performed) are preferably highlighted 118. In a preferred embodiment, context-sensitive help provides a user with supplementary information regarding a potential conflict (e.g., a conflict resolution dialog). For a highlighted conflict 118, a user preferably activates a pop-up menu 114 of preferences 18, and chooses a preference 18 which is not conflict highlighted 118. The user, selectably pulls down the highlighted preference 118, such as by opening a pop-up menu 114, which shows which item choices 18 would still be conflicted 118, and which would be acceptable. Pop-up menu 114 typically displays all selectable preferences 18, such as preferences 18 defined by the initial sets 16 being merged (e.g., preference Opt N-1 from a first set 16a, and preference Opt N-2 from a second set 16b), as well as other selectable preferences 18 (e.g., preference Opt N-3) for the new destination printer 26.

In a preferred embodiment, a log is prepared for selected sets 16 of preferences 18 for a processed print job 21. For imported printer driver sets 16 where preferences 18 were matched, such as by terminology resolution 106 or by conflict resolution 118, the eventual output resulting from the selected set 16 may be fine, or may produce undesirable output, such as if one or more preferences 18 were improperly resolved. The job log therefore provides a convenient means to capture and provide feedback to the resolution process, based on successful or unsuccessful output. The user may preferably inspect the job log, to compare the chosen preferences 18 for the current print job 21 to the imported preferences 18, such as to detect discrepancies.

Master Sets of Printer Preferences. In the prior art, secondary users currently have to make each and every change to a printer driver, such as through sub-menus, before a print job 21 is printed, even if the user is printing to the same printer 26 as the first user. Such manual entry of detailed multiple settings is prone to error. For complicated color process printers 26 or large format plotters 26, the resulting mistakes can be quite extensive and costly.

Figure 15:
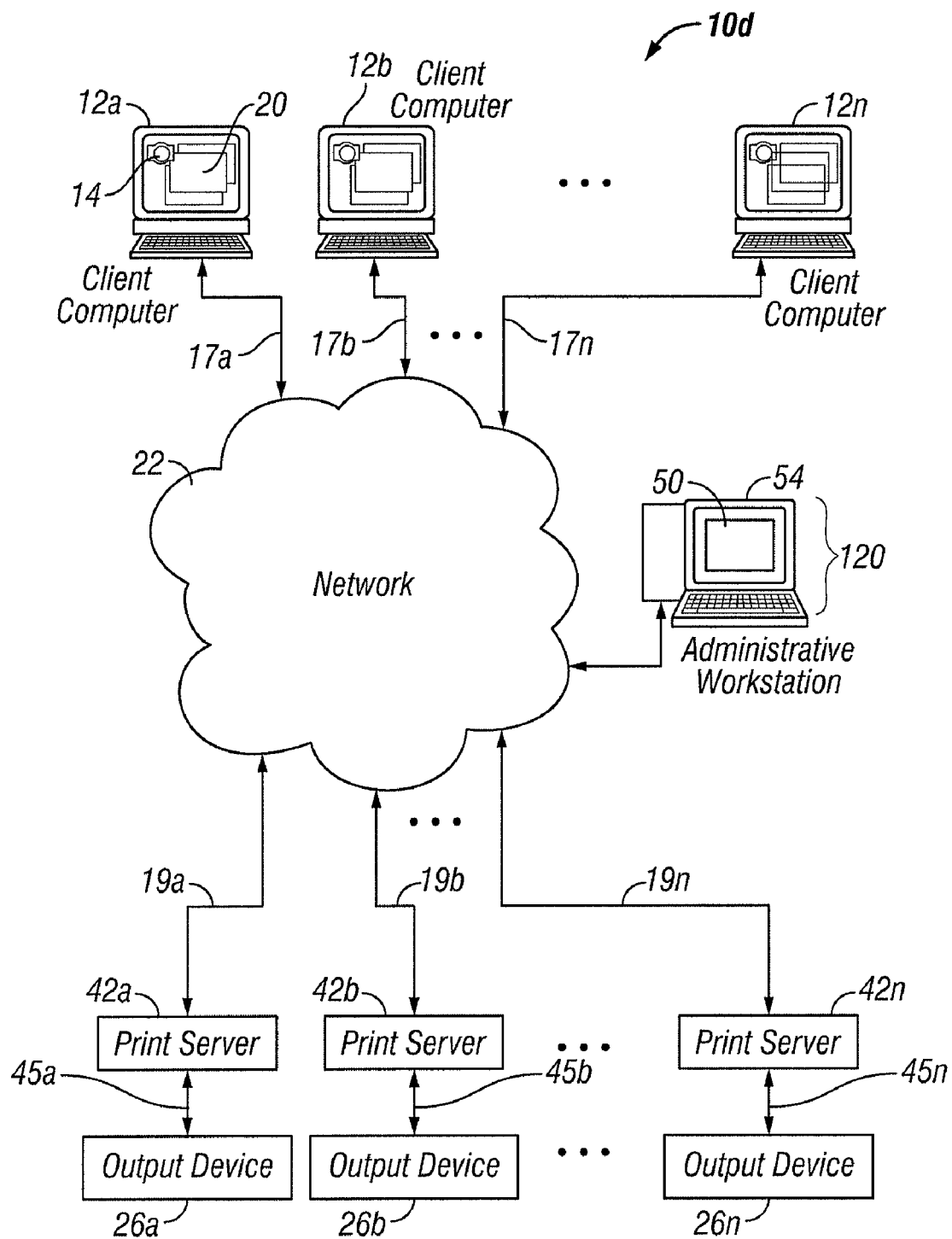
FIG. 15 is a schematic diagram a multiple printer embodiment of the transferable and reusable printer preference system, wherein sets of reusable and transferable preferences are established, stored and maintained at a central administrative workstation.

FIG. 15 is a schematic diagram a multiple printer embodiment of the transferable and reusable printer preference system 10d, wherein sets 16 of reusable and transferable preferences 18 are established, stored and maintained at a central administrative workstation 120. In a networked environment 22, there are often collaborative efforts between a plurality of users at a plurality of client computers 12. It is often desirable to specify and control the publication of documents from a single computer 12 or administrative workstation 120, such as in a publishing or MIS environment, where multiple users are responsible for creating one or more documents requiring strictly controlled features, such as page layouts and color preferences.

In contrast to the prior art, master sets 16 of preferences 18 are preferably established at a single location, such as at an administrative workstation 120, and are then broadcast out to networked client computers 12a-12n, to provide controlled output of print jobs 21 at one or more printers 26a-26n.

A user, such as an MIS administrator, at an administrative workstation 120 may establish sets of preferences 18, and may preferably control the storage and modification of the defined sets 16. In a publishing environment, therefore, print jobs 21 can be processed by any user at a client computer 12a-12n, using the sets 16 defined and maintained by the administrative workstation 120. The administrative user may also modify defined sets 16 of preferences 18 for operation at any of a plurality of print servers 42a-42n and output devices 26a-26n, whereby a print job 21 sent from any client computer 12a-12n is processed similarly. Individual users at client computers 12 are not required to modify their own sets 16 of preferences 18, since they are automatically supplied with a networked choice of available sets 16 of printer preferences 18, such as through the user interface of their user applications 20.

For example, in a networked environment between client computers 12a-12n that is used for color graphics production, there are often detailed and complicated color calibrations within a specified set 16 of printer preferences 18, by which a plurality of users are required to use the same specified set 16 of printer preferences 18 (e.g., often comprising as many as twenty different calibration steps, brightness values, swap simulation values, Hewlett Packard PCL® Configure Image Data (CID) command selection values, and International Color Consortium profile values).

System Advantages. The transferable printer driver preferences system 10 and its methods of use provide reusable and transferable sets 16 of printer driver preferences 18. For a single user working at one or more client computers 12a-12n, defined sets 16 are always close at hand. Sets 16 can be easily merged to provide similar output and finishing at multiple output devices 26. Different users at different client computers 12a-12n have access to defined sets, and can use them "as is," or may modify them or merge them with other sets to quickly and efficiently create new printer driver preference sets 16. In a master-client environment 10d (FIG. 15), one or more sets 16 of printer driver preferences 18 are defined and controlled from a central location 120, whereby the application files 21 produced or modified at one or more client computers 12a-12n are similarly formatted, using the predefined and selectable sets 16 of printer driver preferences 18.

Although the reusable and transferable printer driver preferences system 10 and its methods of use are described herein in connection with client computers 12, networks 22, print servers 42, and printers 26, the system and techniques can be implemented with other computers 12, servers and image processing devices, such as print controllers, scanners and copiers, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A system comprising:
a network of printers and users;
a plurality of printers operatively coupled via said network, capable of performing a set of print features, wherein each print feature from the set of print features includes a keyword describing said features;
a single central administrative workstation computer coupled to a network of client computers, said central administrative workstation configured with:
  a processor operatively coupled with a display for presenting a printer driver control interface to an administrative user;
  a plurality of previously defined sets of printer driver preferences, wherein each previously defined set is given a set name to identify the set, wherein the plurality of previously defined sets of printer driver preferences are presented to the administrative user by their set names;
  a memory for storing the plurality of previously defined sets of printer driver preferences at the central administrative workstation;
  an input for accepting administrative modifications to at least one printer driver preference set from among the plurality of previously defined sets of printer driver preferences, forming a modified set, the modified set including a print feature having a keyword which is defined for a first printer but is not defined for at least one additional printer;
  wherein said central administration workstation maintains the sole ability to modify said at least one printer driver preference set, thereby enforcing strict control over the at least one printer driver preference set; and
  a network interface configured for broadcasting said modified set to at least one client computer operatively coupled with a user-chosen printer from among the plurality of printers;

wherein said central administrative workstation computer is configured for sending the modified set to at least one client computer;

wherein said central administrative workstation computer is configured for automatically modifying a printer driver preference at said at least one additional client computer;

wherein said at least one additional client computer uses said modified set to print a print job to an output device; and wherein said central administrative workstation computer further comprises a printer driver for performing conflict resolution when a modified set contains a print feature that is not defined for said user-chosen printer, wherein said conflict resolution comprises automatic keyword matching and querying an administrator at said central administrative workstation for a resolution.

2. The system of claim 1, wherein the plurality of previously defined sets of printer driver preferences comprises a plurality of printer driver preference values.

* * * * *